United States Patent
Peace, Jr.

(10) Patent No.: US 10,516,963 B2
(45) Date of Patent: Dec. 24, 2019

(54) ADJUSTING THE PERCEIVED ELEVATION OF AN AUDIO IMAGE ON A SOLID CINEMA SCREEN

(71) Applicant: HARMAN INTERNATIONAL INDUSTRIES, INCORPORATED, Stamford, CT (US)

(72) Inventor: Paul Wayne Peace, Jr., Port Hueneme, CA (US)

(73) Assignee: HARMAN INTERNATIONAL INDUSTRIES, INCORPORATED, Stamford, CT (US)

( * ) Notice: Subject to any disclaimer, the term of this patent is extended or adjusted under 35 U.S.C. 154(b) by 0 days.

(21) Appl. No.: 15/874,818

(22) Filed: Jan. 18, 2018

(65) Prior Publication Data

US 2019/0045320 A1     Feb. 7, 2019

Related U.S. Application Data

(60) Provisional application No. 62/541,503, filed on Aug. 4, 2017.

(51) Int. Cl.
*H04S 7/00* (2006.01)
*H04R 5/02* (2006.01)
(Continued)

(52) U.S. Cl.
CPC ............ *H04S 7/305* (2013.01); *H04N 9/30* (2013.01); *H04R 1/345* (2013.01); *H04R 3/04* (2013.01);
(Continued)

(58) Field of Classification Search
CPC .......... H04S 7/305; H04S 3/008; H04S 7/302; H04S 2400/01; H04S 2420/01; H04N 9/30; H04R 3/04; H04R 5/02; H04R 5/04
See application file for complete search history.

(56) References Cited

U.S. PATENT DOCUMENTS 5,216,209 A * 6/1993 Holdaway .............. H04R 1/345
                                                    181/144
6,643,377 B1 * 11/2003 Takahashi ................ H04S 1/00
                                                    181/155
(Continued)

FOREIGN PATENT DOCUMENTS

JP      H02-250600 A    10/1990
JP      2006-019864 A   1/2006

OTHER PUBLICATIONS

Extended European Search Report for Application No. 18180767.8 dated Nov. 7, 2018.

*Primary Examiner* — Andrew L Sniezek
(74) *Attorney, Agent, or Firm* — Artegis Law Group, LLP (57) ABSTRACT

Techniques are disclosed for an audiovisual system having a display screen that is solid and/or otherwise non-transparent to sound. The sound output from a loudspeaker is oriented to intersect with a portion of the display screen, and a reflection of the sound off of the display screen is directed toward a viewing position in the audiovisual system. Further signal processing techniques to generate sound for output by a loudspeaker oriented at the display screen and other loudspeakers are disclosed. Additionally, other signal processing and control techniques are disclosed that affect audio and video output in the audiovisual system.

19 Claims, 10 Drawing Sheets

(51) Int. Cl.
    *H04R 5/04*     (2006.01)
    *H04S 3/00*     (2006.01)
    *H04N 9/30*     (2006.01)
    *H04R 3/04*     (2006.01)
    *H04R 1/34*     (2006.01)
    *H04R 1/40*     (2006.01)
    *H04R 27/00*     (2006.01)

(52) U.S. Cl.
    CPC ................ *H04R 5/02* (2013.01); *H04R 5/04* (2013.01); *H04S 3/008* (2013.01); *H04S 7/30* (2013.01); *H04S 7/302* (2013.01); *H04R 1/403* (2013.01); *H04R 27/00* (2013.01); *H04S 2400/01* (2013.01); *H04S 2400/11* (2013.01); *H04S 2420/01* (2013.01)

(56) References Cited

U.S. PATENT DOCUMENTS

| | | | |
|---|---|---|---|
| 2005/0025318 A1* | 2/2005 | Sadaie | .................. H04R 1/403 381/63 |
| 2005/0249356 A1 | 11/2005 | Holmi et al. | |
| 2008/0170729 A1 | 7/2008 | Lissaman et al. | |

* cited by examiner

ADJUSTING THE PERCEIVED ELEVATION OF AN AUDIO IMAGE ON A SOLID CINEMA SCREEN

CROSS-REFERENCE TO RELATED APPLICATIONS

This application claims benefit of the U.S. Provisional Patent application titled, "ADJUSTING THE PERCEIVED ELEVATION OF AN AUDIO IMAGE ON A SOLID CINEMA SCREEN," filed Aug. 4, 2017 and having Ser. No. 62/541,503. The subject matter of this related application is hereby incorporated herein by reference.

BACKGROUND

Field of the Embodiments

The contemplated embodiments relate generally to audio systems and, more specifically, to adjusting the perceived elevation of an audio image on a solid cinema screen.

Description of the Related Art

Conventional cinema screens include perforations that allow sound waves to travel from loudspeakers located behind the cinema screen to audience members located in front of the cinema screen. In order to create an immersive experience, the perceived location of a sound—referred to herein as an audio image—should closely track the visual position of the on-screen object that is producing the sound. The object that is producing the sound is referred to herein as a visual sound source. A visual sound source may include a person, an animal, an object, and so forth. Typically, loudspeakers are distributed at different positions behind the cinema screen to achieve this effect. By matching the location and/or levels of the loudspeakers that output object-specific sounds with the portions of the screen on which those objects are displayed, the spatial offset between the audio image and the visual sound source can be reduced.

However, as many theaters, stadiums, convention centers, home theaters, etc. begin to transition to new display screen technologies, such as light emitting diode (LED) screens, positioning loudspeakers behind the screen itself may not be an option. In particular, various types of screens (e.g., LED cinema screens) are opaque or semi-opaque to sound waves and, thus, prevent sound waves from passing through the screen to audience members located in front of the screen. In addition, other types of modern screens may include materials that reflect, distort, and/or otherwise obstruct sound waves from traveling through the cinema screen. Thus, loudspeakers located behind such screens cannot effectively transmit sound through the screen to the audience located in front of the screen.

One proposed solution to the above drawback is to spatially displace loudspeakers from the screen, thereby allowing sound waves to travel to the audience unimpeded. For example, loudspeakers could be located above the screen, to the side(s) of the screen, and/or below the screen. However, physically displacing loudspeakers from the screen may introduce a spatial offset between the audio image and the visual sound source. Such an offset may diminish the perceived realism of the film, may distract a user, and may also decrease the quality of the overall user experience. In addition, this offset may be more prominent for audience members that are positioned closer to the screen.

As the foregoing illustrates, more effective techniques for implementing an audio system in conjunction with a solid cinema screen would be useful.

SUMMARY

Various embodiments of the present disclosure set forth a method for adjusting the perceived elevation of an audio image on a solid cinema screen. The method includes orienting a center axis of a first loudspeaker to intersect with a portion of a display screen and outputting a first sound from the first loudspeaker towards the display screen. A reflection of the first sound off of the display screen is directed towards a display screen viewing position.

Various embodiments of the present disclosure further set forth a method for storing a value related to at least one of (i) a distance between a first loudspeaker and a second loudspeaker, and (ii) a distance between the first loudspeaker and a display screen, and causing a first signal to be delayed by at least an amount of time proportional to the value.

Further embodiments provide, among other things, a system and computer-readable storage medium for implementing aspects of the methods set forth above.

Advantageously, the disclosed techniques improve the alignment between the perceived location of a sound—referred to herein as an audio image—and the visual position of the on-screen object that is producing the sound—referred to herein as a visual sound source—in entertainment systems with screens that block or distort sound waves, such as LED screens. The disclosed techniques further improve the quality of the sound by reducing or eliminating tonal distortions associated with various signal processing techniques, such as head-related transfer function filters, that may have been implemented to adjust the audio image. Accordingly, the techniques disclosed herein enable high quality audio soundtracks to be reproduced with screens that are solid and/or non-transparent to sound waves while reducing the offset between the audio image and the visual sound source.

BRIEF DESCRIPTION OF THE SEVERAL VIEWS OF THE DRAWINGS

So that the manner in which the recited features of the one or more embodiments set forth above can be understood in detail, a more particular description of the one or more embodiments, briefly summarized above, may be had by reference to certain specific embodiments, some of which are illustrated in the appended drawings. It is to be noted, however, that the appended drawings illustrate only typical embodiments and are therefore not to be considered limiting of its scope in any manner, for the scope of the various embodiments subsumes other embodiments as well.

DETAILED DESCRIPTION

In the following description, numerous specific details are set forth to provide a more thorough understanding of the embodiments of the present disclosure. However, it will be apparent to one of skill in the art that the embodiments of the present disclosure may be practiced without one or more of these specific details.

System Overview

Figure 1:
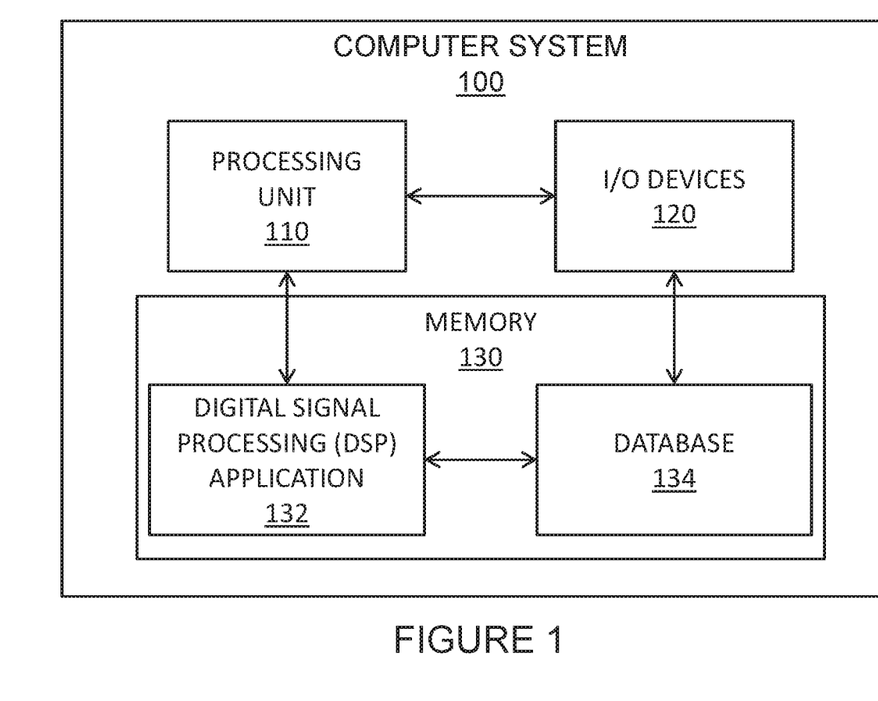
FIG. 1 illustrates a conceptual block diagram of a computing system configured to implement one or more aspects of an audiovisual system described in the present disclosure, according to various embodiments.

FIG. 1 illustrates a conceptual block diagram of a computing system configured to implement one or more aspects of an audiovisual system described in the present disclosure. As shown, computing system 100 includes, without limitation, processing unit 110, I/O devices 120, and memory device 130. Memory device 130 includes digital signal processing (DSP) application 132 configured to interact with database 134. The computing system 100 may be part of an audiovisual system such as those shown in FIGS. 3-5.

Processing unit 110 may include a central processing unit (CPU), a digital signal processing unit (DSP), a controller unit, and so forth. In various embodiments, processing unit 110 is configured to receive an input signal, such as an analog signal, a digital signal, etc. Processing unit 110 processes the input signal(s) to generate one or more output signals (e.g., with filters, amplifiers, delays, and/or other processing techniques). Processing unit 110 may output the processed signal to I/O devices 120.

I/O devices 120 may include various types of signal source and signal sinks. Signal sources may include, without limitation, devices that read optical/analog data (e.g., for film), devices that store and/or read digital data (e.g., for digital files), auxiliary input channels, sound generators, video or graphics generators, or any other source of data that may be used by computing system 100. Examples of signal sinks include analog and/or digital signal receivers, amplifiers, loudspeakers (e.g., subwoofers, horn-type loudspeakers, electrostatic loudspeakers, planar-magnetic loudspeakers, and so forth), video display devices, or any other source that may receive data from computing system 100. Signal sources and sinks may be directly or indirectly connected to computing system 100.

Memory unit 130 may include a memory module or collection of memory modules. Memory unit 130 includes digital signal processing (DSP) application 132 and database 134. DSP application 132 may communicate with and/or control one or more elements of I/O devices 120, and database 134, thereby implementing some or all functionalities of computing system 100. Database 134 may store digital signal processing algorithms, HRTFs, lists of frequencies for filtering, loudspeaker presets, and so forth.

Computing system 100 as a whole may be a microprocessor, an application-specific integrated circuit (ASIC), a system-on-a-chip (SoC), a mobile computing device (e.g., a tablet computer or cell phone), a plug-and-play system, and so forth. Generally, computing system 100 may be configured to coordinate the overall operation of one or more loudspeakers in I/O devices 120. In other embodiments, computing system 100 may be coupled to, but separate from, one or more loudspeakers in I/O devices 120. In such embodiments, I/O devices 120 may include a processor that transmits an input signal to computing system 100 and receives a processed signal from computing system 100. Although various techniques disclosed herein (e.g., signal processing, HRTF filtering, etc.) as are described as being performed via DSP application 132, in various embodiments, any of these techniques may be performed by a dedicated digital signal processor (DSP), an application-specific integrated circuit (ASIC), a system-on-a-chip (SoC), a microprocessor, etc. Additional examples of signal processing techniques carried out by computing system 100 are provided below.

Figure 2:
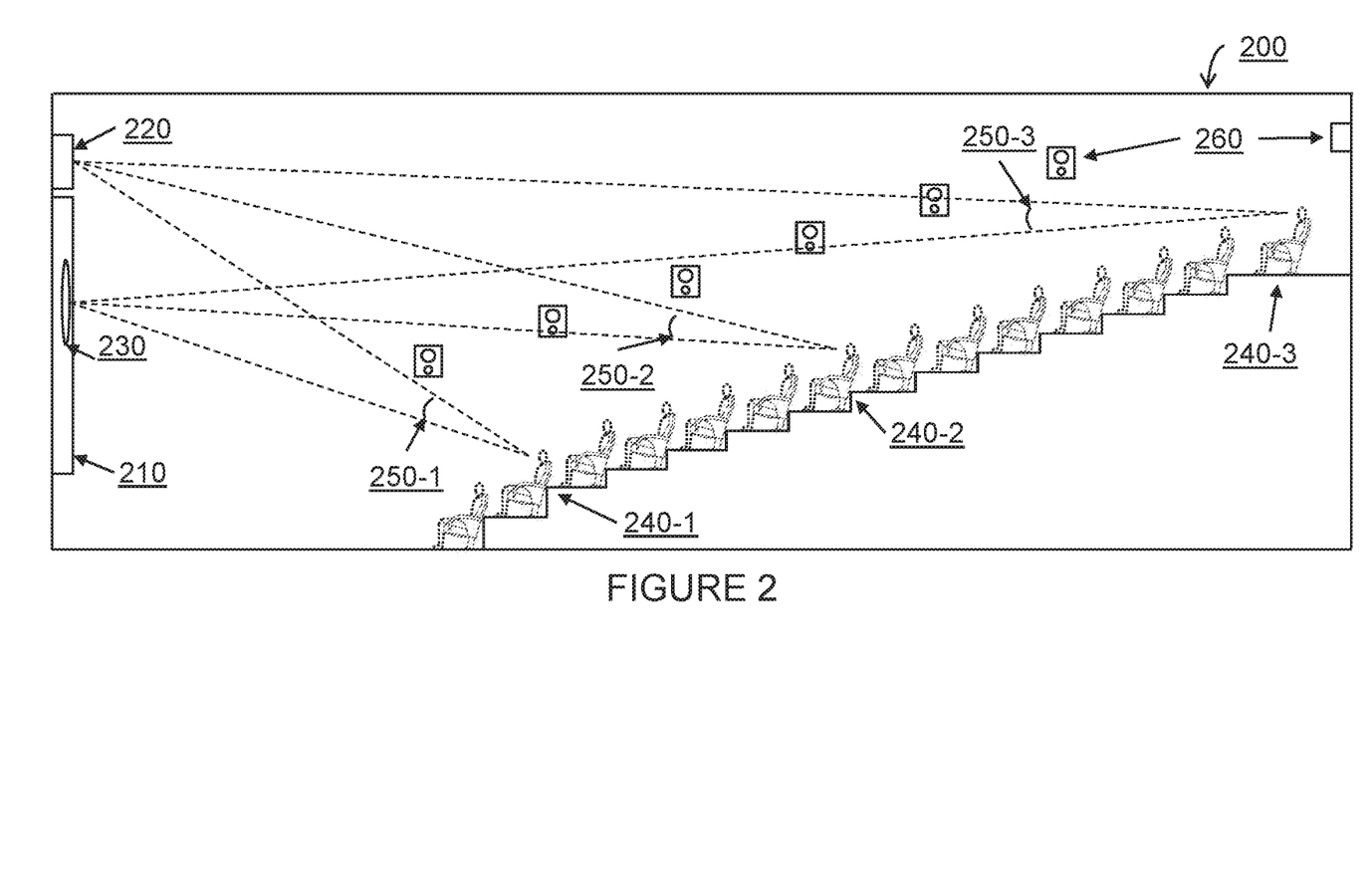
FIG. 2 illustrates an audiovisual system having an offset between an audio image and the location of a visual sound source, according to various embodiments.

FIG. 2 illustrates an audiovisual system having an offset between an audio image and the location of a visual sound source, according to various embodiments. Audiovisual system 200 includes screen 210, one or more loudspeakers 220, and one or more surround loudspeakers 260.

As shown, FIG. 2 depicts a visual sound source 230 displayed at the location indicated on screen 210. Other visual sound sources may be displayed at other locations on screen 210 (not shown). At the same time visual sound source is displayed, loudspeakers 220 may generate sound waves corresponding to the sound(s) produced by the visual sound source 230. For example, visual sound source 230 could be human mouth moving in a speaking manner, and loudspeakers 220 could generate sound waves that include the verbal dialog associated with the movement. Absent the techniques disclosed herein, an audio image may be aligned with the loudspeakers 220, from the perspective of a user, instead of being aligned with the location of the appropriate visual sound source on screen 210.

Audiovisual systems, such as audiovisual system 200, generally have many locations where users may simultaneously perceive video on screen 210 and audio from loudspeakers 220 or surround loudspeakers 260. Some of these locations may be generally constrained (e.g., at approximately head level in a seat located in a theater-style seating environment) while others may be highly variable (e.g., a user standing in the same room as a home theater system). These locations are referred to herein as user perspectives. For example, user perspective 240-1 is located somewhere in the second row of an exemplary audiovisual system having theater seating. Of course, many other unmarked user perspectives exist in the audiovisual system shown in FIG. 2.

Users positioned at user perspectives 240-1, 240-2, and 240-3 can see visual sound source 230 and hear sound waves from loudspeakers 220. Varying audiovisual offsets may arise between the visual sound source and the audio image, subject to the particular user perspective. For example, at user perspective 240-3, audiovisual offset 250-3 may be 1 degree. At user perspective 240-2, audiovisual offset 250-2 may be 6 degrees. At user perspective 240-1, audiovisual offset 250-3 may be 12 degrees. These misalignments between the visual sound source and the audio image may distract the user when the angular separation exceeds about 6 degrees. For example, a user may hear a dog bark from a loudspeaker positioned above the screen—the audio image—causing the user to look at the top of the screen. At the same time, the dog, or visual sound source, may be displayed on the bottom of the screen. In general, the magnitude of the audiovisual offset (i.e., the misalignment) between the visual sound source and the audio image depends on the user perspective relative to the location of the visual sound source on the screen and the location(s) of the primary loudspeaker(s) producing the audio image.

One technique to reduce the audiovisual offset involves the use of a head-related transfer function (HRTF). HRTFs adjust the intensity and timing of the spectral content of sound waves to adjust the location of their perceived source when heard by a user. Various anatomical features of a body of a user may affect the perceived location of a sound source like loudspeakers 220. In particular, a shape and a size of a forehead, a face, an ear, a chin, a chest, and other parts of a body of a user affect the perceived location of a sound source. For example, sound waves reflect off of various parts of the body of the user, enter the user's ear canal, and vibrate the user's ear drums. The shape of various body parts affects the intensity differences and timing delay between sounds heard through the right ear and sounds heard through the left ear. These intensity differences and timing delay may vary across the spectral components of the sound. Based on these intensity differences and timing delays, the user perceives sound generated by the loudspeaker 220 as originating from a particular location.

By determining a body geometry of an average user, a HRTF may be generated that enables intensity differences and timing delays to be adjusted in order to modify a perceived location of a sound source. In various embodiments, DSP application 132 may apply one or more filters to the input signal, such as filters that correspond to one or more head-related transfer functions (HRTFs). For example, when loudspeakers 220 are positioned above screen 230, DSP application 132 can reduce the perceived spatial offset 250 of sound at user perspectives, including positions 240-1, 240-2, and 240-3, for example, by filtering input signals to amplify intensity differences and timing delays associated with a lower perceived elevation and suppress intensity differences and timing delays associated with a higher perceived elevation to lower or de-elevate the perceived position of the sound source.

In various embodiments, filtering an input signal utilizing HRTFs based on the average user may distort the output sound for particular users. For example, sound in the 7 kHz region is a significant contributor to how the brain vertically positions an audio image. Errors in this frequency range between the idealized HRTF and the HRTF of a particular user may vary over time, resulting in a distracting or disorienting experience where, for example, the perceived audio image is unstable. In addition, the frequency response of a filtered input signal may not be flat. Thus, some frequencies may be disproportionately amplified relative to other frequencies. For example, lower frequencies could be disproportionately amplified relative to higher frequencies.

Figure 3:
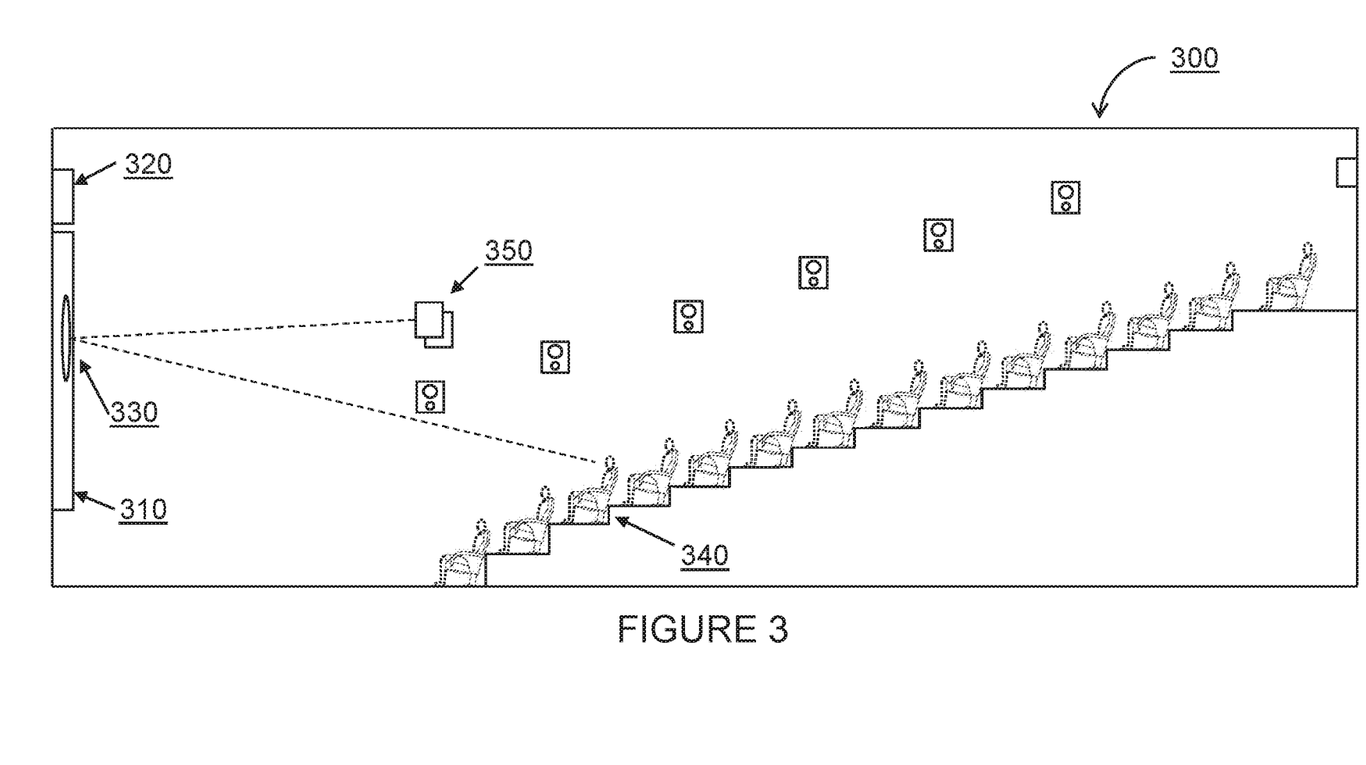
FIG. 3 illustrates an audiovisual system with auxiliary loudspeakers located near the ceiling for reducing the offset illustrated in FIG. 2 and improving the tonal quality of sound, according to various embodiments.

FIG. 3 illustrates an audiovisual system with auxiliary loudspeakers located near the ceiling for reducing the offset illustrated in FIG. 2 and improving the tonal quality of sound, according to various embodiments. As shown, audiovisual system 300 includes primary loudspeakers 320, auxiliary loudspeakers 350, and visual sound source 330 on screen 310. User perspective 340 is located somewhere in the third row associated with audiovisual system 300.

As described above, when HRTF-filtered sound is emitted by primary loudspeakers 320, the perceived spatial offset between primary loudspeakers 320 and visual sound source 330 is reduced. As explained above, differences between an HRTF based on an average person and an HRTF associated with a particular person may cause errors in the audio image, and the HRTF may introduce other tonal distortions. One or more auxiliary loudspeakers 350 are included in audiovisual system 300 to compensate for these issues. In one embodiment, auxiliary loudspeakers 350 are placed near the ceiling of audiovisual system 300 to output sound. Furthermore, auxiliary loudspeakers 350 may output sound that travels to visual sound source 330, such as via directional beamforming. Sound waves that reflect off of screen 310 at the position of visual sound source 330 may be perceived by users at user perspective 340 as being collocated with visual sound source 330. In some embodiments, auxiliary loudspeakers 350 are positioned and oriented near the ceiling of audiovisual system 300 at a position to reflect maximum sound intensity to a particular location in the viewing environment. For example, auxiliary loudspeakers 350 may output sound that reflects off of screen 310 to produce maximum sound intensity at the center of the third row of the viewing environment at user perspective 340.

Note that because the HRTF filtering process introduces tonal distortion, in some embodiments, primary loudspeakers 320 may be omitted, and the auxiliary loudspeakers 350 may output full-range audio towards screen 310 in order to reflect sound towards one or more user perspectives. Such techniques may require that the auxiliary loudspeakers output all of their sound energy to the reflection surface without emitting sound directly to the audience.

In various embodiments, DSP application 132 configures auxiliary loudspeakers 350 to output sound in conjunction with primary loudspeakers 320. In particular, DSP application 132 configures auxiliary loudspeakers 350 to augment sound output by primary loudspeakers 320. For example, auxiliary loudspeakers 350 could output sound in a band centered at 7 kHz, if sound output by primary loudspeakers 320 in the 7 kHz frequency range is suppressed (e.g., due to HRTF filtering). In addition, the amplitude of the sound waves generated by auxiliary loudspeakers 350 may be adjusted based on the coefficient of reflectivity of screen 310, the distance between the auxiliary loudspeakers and the screen, and the distance between the screen and the audience. For example, the amplitude of the sound waves may be increased if the coefficient of reflectivity is lower than a threshold and may be decreased if the coefficient of reflectivity is higher than a threshold.

In various embodiments, sound waves output by auxiliary loudspeakers 350 improve the stability of the audio image produced by the HRTF-filtered sound waves that are being output by primary loudspeakers 320. For example, auxiliary loudspeakers 320 could be positioned and oriented so that sound waves reflected off of screen 320 are perceived by the user as originating from visual sound source 330. In this manner, sound waves generated by auxiliary loudspeakers 350 improve and stabilize the audio image produced by the HRTF-filtered sound waves output by primary loudspeakers 320. Additionally, or alternatively, sound waves that are generated by auxiliary loudspeakers 350, which reflect off of the screen 310 towards one or more users, may compensate for tonal distortion that is a byproduct of one or more filtering techniques (e.g., HRTF filtering).

Figure 4A:
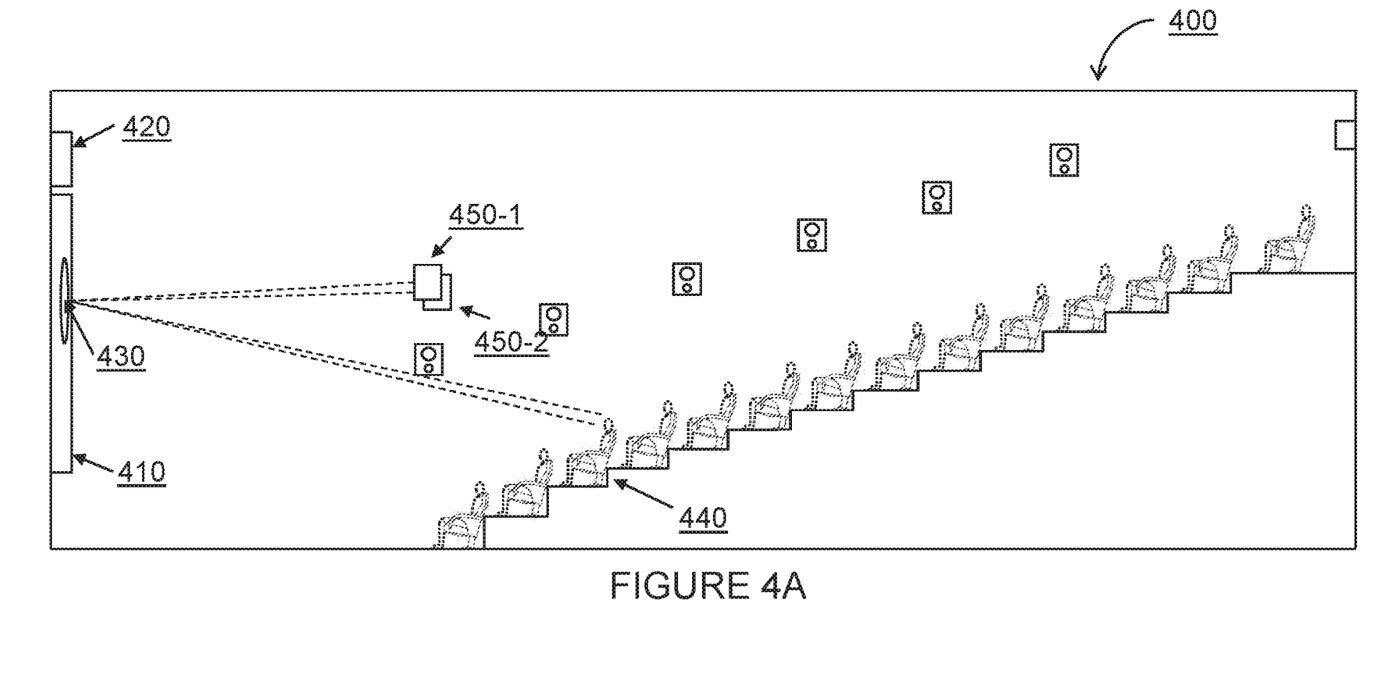
FIG. 4A illustrates an elevation view of an audiovisual system with auxiliary loudspeakers located near the sides of the audiovisual system, according to various embodiments.

FIG. 4A illustrates an elevation view of an audiovisual system with auxiliary loudspeakers located near the sides of the audiovisual system, according to various embodiments. As shown, audiovisual system 400 includes primary loudspeakers 420, auxiliary loudspeakers 450, and visual sound source 430 on screen 410. User perspective 440 is located somewhere in the third row associated with audiovisual system 400.

Auxiliary loudspeakers 450 are located at the sides of audiovisual system 400. Auxiliary loudspeakers 450 are configured to direct sound waves to the horizontal plane of visual sound source 430. Sound waves that reflect off of screen 410 at a similar horizontal plane as visual sound source 430 may be perceived by users at user perspective 440 as being vertically collocated with visual sound source 430, thereby reducing the perceived spatial offset.

Figure 4B:
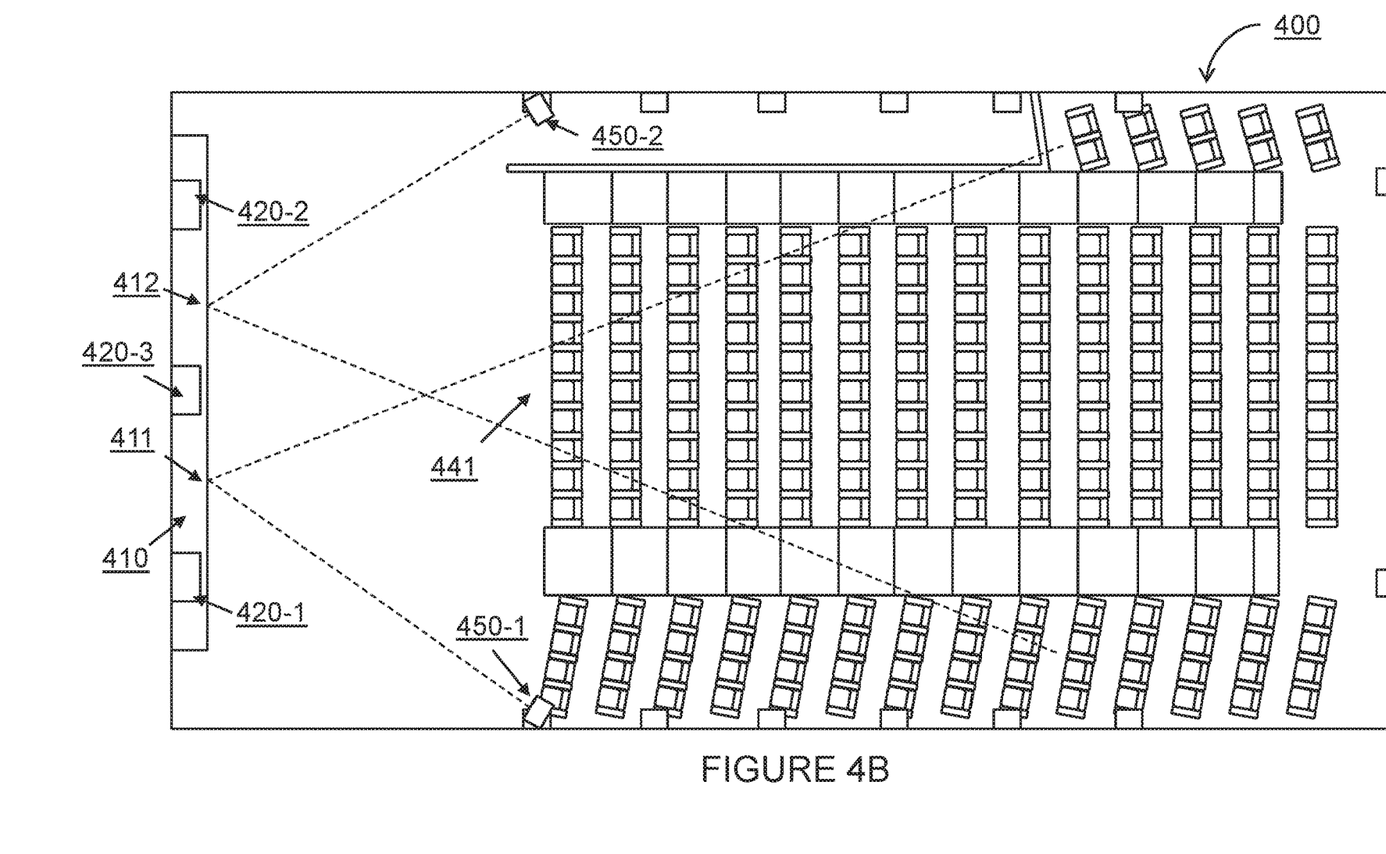
FIG. 4B illustrates a plan view of the audiovisual system of FIG. 4A, according to various embodiments.

FIG. 4B illustrates a plan view of the audiovisual system of FIG. 4A, according to various embodiments. Auxiliary loudspeaker 450-1 generates left sound waves directed to the left ears of users of audiovisual system 400. Auxiliary loudspeaker 450-2 generates right sound waves directed to the right ears of users of audiovisual system 400. As explained above, the maximum perceived audiovisual offset may occur at the first row of some audiovisual systems (e.g., at user perspective 441). Therefore, the position, directivity, and orientation of auxiliary loudspeakers 450-1 and 450-2 may be altered so that the maximum of the reflected left sound waves and reflected right sound waves intersect at or before the first row at user perspective 441 may mitigate the effects of the HRTF filtering process for the largest number of user perspectives. In certain audiovisual systems, positioning auxiliary loudspeakers 450-1 and 450-2 in line with the first row of user perspective 441 may cause sound energy output from the auxiliary loudspeakers to combine in front of the first row of user perspective 441. In other embodiments, auxiliary loudspeakers 450-1 and 450-2 may be positioned on the sides of audiovisual system 400 and oriented so that the maximum of the reflected left sound waves and reflected right sound waves intersect at any other row (e.g., at the third or fourth row).

In general, the auxiliary loudspeaker(s) are designed and positioned to distribute even sound coverage across user perspectives while producing an audio image at the correct location on the screen. Auxiliary loudspeakers 450-1 and 450-2 located at the sides of the audiovisual system 400 may preferably be at a vertical level that is even with the midpoint of the height of the screen 410. The center axis of the acoustic energy output from auxiliary loudspeaker 450-1 may then be horizontally aimed at a midpoint 411 between the left third and the center third of the screen 410. Similarly, the center axis of the acoustic energy output from auxiliary loudspeaker 450-2 may then be horizontally aimed at a midpoint 412 between the right third and the center third of the screen 410.

Figure 5:
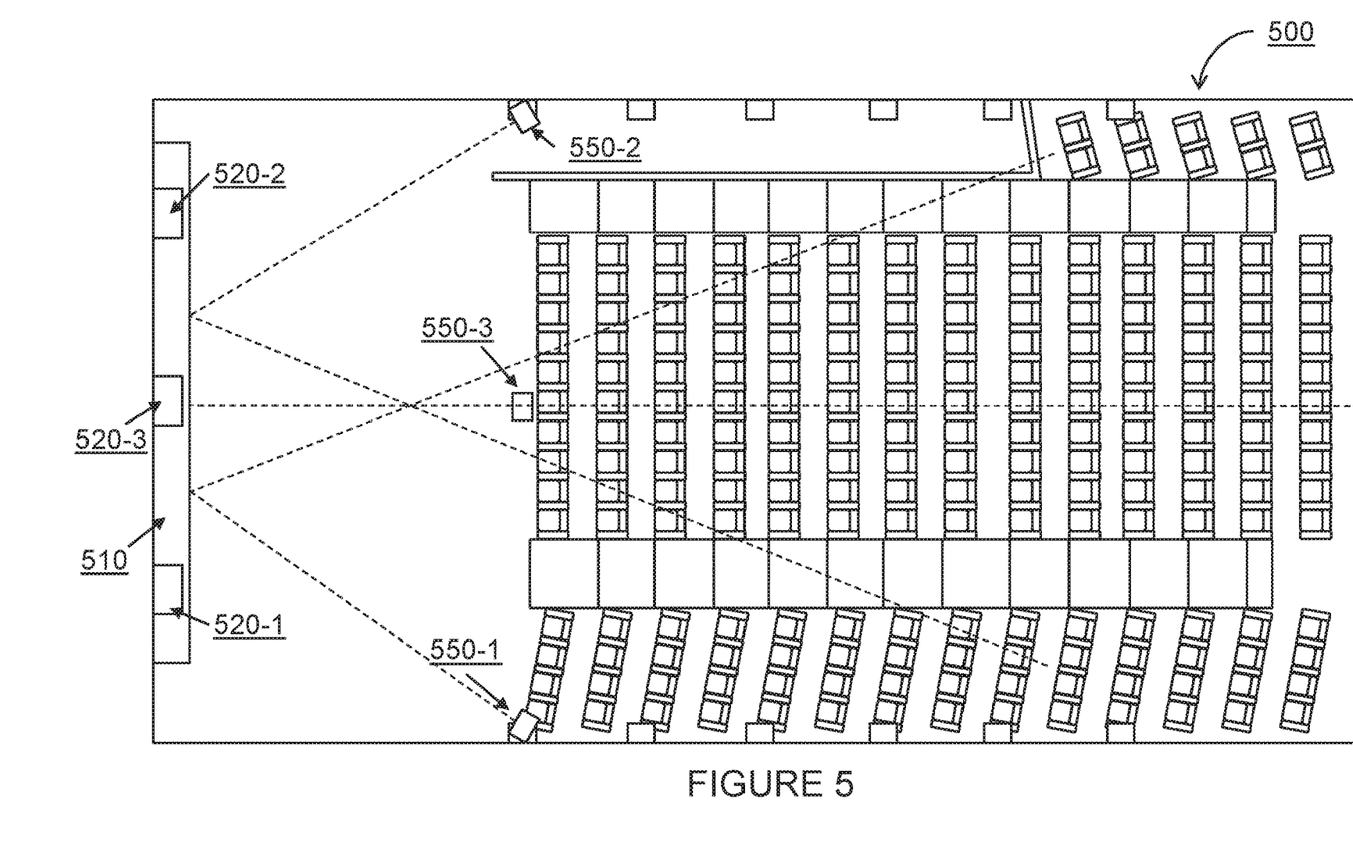
FIG. 5 illustrates a plan view of an audiovisual system with auxiliary loudspeakers located near the sides and the ceiling of the audiovisual system, according to various embodiments.

FIG. 5 illustrates a plan view of an audiovisual system with auxiliary loudspeakers located near the sides and the ceiling of the audiovisual system, according to various embodiments. As shown, audiovisual system 500 includes screen 510, primary loudspeakers 520, auxiliary loudspeakers 550-1 and 550-2 located at the sides of audiovisual system 500, and auxiliary loudspeaker 550-3 located near the ceiling of audiovisual system 500.

Sound output from left auxiliary loudspeaker 550-1, right auxiliary loudspeaker 550-2, and center auxiliary loudspeaker 550-3 may combine to further reduce any audiovisual offset or mitigate the effects of HRTF filtering, to increase number of user perspectives in audiovisual system 500 receiving combined sound from auxiliary and primary loudspeakers, or to provide more even coverage of sound energy output from the auxiliary loudspeakers In each of the above embodiments, a primary or auxiliary loudspeaker may include one or more loudspeaker types. Further, each marked location of a primary or auxiliary loudspeaker may include one or more loudspeakers. For example, auxiliary loudspeaker 450-1 may include three horn-type loudspeakers. In general, the shape of the loudspeaker waveguide may adjust the output angle and directivity of the output sound. As used herein, the center axis of a loudspeaker refers to the axis aligned with the peak direction of the acoustic energy output. For example, the center axis of a horn-type loudspeaker may be on the axis extending perpendicularly away from the loudspeaker horn. In a preferred embodiment, the directionality of the auxiliary loudspeakers preferably results in a coverage area that minimizes the amount of sound energy directly transmitted to the various user perspectives in an audiovisual system (e.g., a low beamwidth). For example, the sound energy level directly received from an auxiliary loudspeaker at a user perspective may be −6 dB, −10 dB, −15 dB, or −20 dB as compared to the energy received from the sound wave reflected off of the screen in order to reduce or eliminate any detrimental audio artifacts (e.g., echoes). Additionally, auxiliary loudspeakers 450 may have a higher throw distance than primary loudspeakers in order to generate sound waves that travel to and reflect off of the screen before traveling to a user perspective.

Figure 6:
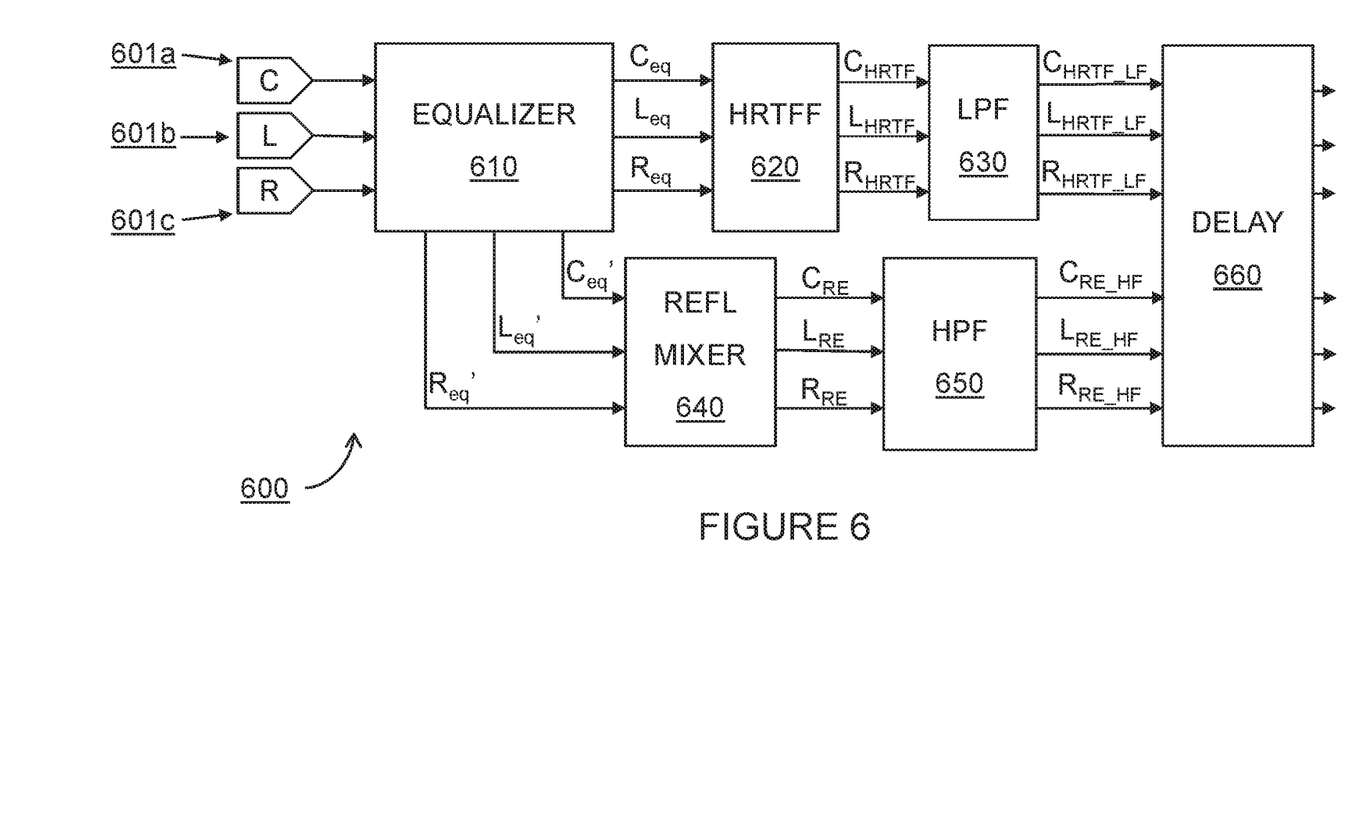
FIG. 6 illustrates a block diagram of signal processing circuitry that could be implemented to generate output(s) to one or more auxiliary loudspeakers included in the audiovisual systems of FIGS. 3-5, according to various embodiments.

FIG. 6 illustrates a block diagram of signal processing circuitry that could be implemented to generate output(s) to one or more auxiliary loudspeakers included in the audiovisual systems of FIGS. 3-5, according to various embodiments. Signal processing circuitry 600 may be present in processing unit 110 and used to generate outputs for an audiovisual system. As shown, signal processing circuitry 600 may include an audio input 601, an equalizer 610, a HRTF filter 620, a low-pass filter 630, a reflector mixer 640, a high-pass filter 650, and a delay block 660. Preferably, the processing unit 110 includes one or more programmable memory locations which store values that may be used to adjust how each component operates, which is useful for tuning the audio outputs for individual audiovisual system viewing environments.

Audio input 601 may include one or more analog or digital signals originating from an audiovisual source (e.g., a video file stored on a drive or disc). Audio input 601 may include one or more channels such as center channel 601a, left channel 601b, and right channel 601c. Additional channels for surround loudspeakers such as side, rear, or low-frequency channels are not shown. Audio input 601 may be subject to other audio processing between source and equalizer 610 (e.g., to isolate channels, etc.).

Equalizer 610 receives audio input 601 and may adjust the level of the frequency components contained in audio input 601. As shown, equalizer 610 outputs audio signals $C_{eq}$, $L_{eq}$, and $R_{eq}$ to HRTF filter 620 and audio signals $C_{eq}'$, $L_{eq}'$, and $R_{eq}'$ to reflector mixer 640. In one embodiment, equalizer may include a series finite-impulse response (FIR) filter and infinite-impulse response (IIR) filter. The output of the FIR filter is connected to the input of the IIR filter. In one embodiment, the outputs from the equalizer 610 to the reflector mixer 640 may be from the FIR filter and the outputs from the equalizer 610 to the HRTF filter may be from the IIR filter. Alternatively, the outputs from the equalizer 610 to the HRTF filter 620 and to the reflector mixer 640 may be equivalent.

HRTF filter 620 receives the equalized audio signal from equalizer 610 and applies a HRTF filter. As explained previously, a HRTF may adjust the intensity and timing of the sound wave ultimately received at a user's left ear and right ear to modify a perceived location of a sound source. For example, when primary loudspeakers are located above a screen as shown in FIG. 3, HRTF filter 620 may de-elevate the location of the perceived sound source. HRTF filter 620 outputs $C_{HRTF}$, $L_{HRTF}$, and $R_{HRTF}$, which are filtered with a low-pass filter 630 and the resulting low frequency outputs are input to a delay block 660. The function of low-pass filter 630 is described in further detail below in conjunction with FIG. 8.

In the embodiment shown in FIG. 6, reflector mixer 640 receives the equalized audio signals $C_{eq}'$, $L_{eq}'$, and $R_{eq}'$ from equalizer 610. Reflector mixer 640 synthesizes outputs $C_{RE}$, $R_{RE}$, and $L_{RE}$, for auxiliary loudspeakers therefrom. The mix for each auxiliary channel output $C_{RE}$, $R_{RE}$, and $L_{RE}$, may be based on the relative levels of each channel $C_{eq}'$, $L_{eq}'$, and $R_{eq}'$. $C_{RE}$, $R_{RE}$, and $L_{RE}$, are filtered by a high-pass filter 650 and the resulting high-frequency outputs may be input to the delay block 660. In some embodiments, one or more of $C_{RE}$, $R_{RE}$, or $L_{RE}$ is not delayed (e.g., not routed through delay block 660 or zero delay is applied), since $C_{RE}$, $R_{RE}$, or $L_{RE}$, may serve as a reference for other signals in the audiovisual system. The function of high-pass filter 650 is described in further detail below in conjunction with FIG. 8.

Delay block 660 adjusts the relative timing of $C_{HRTF\_LF}$, $L_{HRTF\_HF}$, $R_{HRTF\_HF}$, $C_{RE\_HF}$, $L_{RE\_HF}$, $R_{RE\_HF}$, and any low frequency or surround loudspeakers (not shown). As noted above, delay block 660 may not receive or delay $C_{RE\_HF}$, $L_{RE\_HF}$, $R_{RE\_HF}$. With reference to FIG. 5, $C_{HRTF\_LF}$, $L_{HRTF\_HF}$, $R_{HRTF\_HF}$ may be the respective audio outputs for primary loudspeakers 520-3, 520-1, and 520-2, while $C_{RE\_HF}$, $L_{RE\_HF}$, and $R_{RE\_HF}$ may be the respective outputs for auxiliary loudspeakers 550-3, 550-1, and 550-2. Subject to the geometries of a particular audiovisual system, including in particular the positioning and directivity of the auxiliary loudspeaker(s) relative to the screen and to the primary loudspeaker(s), the audio output signals $C_{HRTF\_LF}$, $L_{HRTF\_HF}$, and $R_{HRTF\_HF}$ and any other output signal to a non-auxiliary loudspeaker such as surround or low frequency loudspeakers (not shown) should be delayed by approximately the time-of-flight for the sound wave output by an auxiliary loudspeaker to reach the non-auxiliary loudspeaker outputting an associated sound wave (e.g., a sound from the same source in a movie). Referring to FIG. 4B as an example, if auxiliary loudspeakers 450-1 and 450-2 are 30 feet away from primary loudspeaker 420-3, $C_{HRTF\_LF}$ may be delayed at least approximately 26.6 milliseconds relative to $L_{RE\_HF}$ and $R_{RE\_HF}$ based on a speed of sound of 343 meters/second. Alternatively, the distance between auxiliary loudspeakers and the screen may be used to estimate the delay. An additional bias may be added to any delay based on time-of-flight to account for additional signal processing on the auxiliary channels or to further tune the audiovisual system. Note that the delay associated with the auxiliary loudspeaker delay is a "house" delay and is applied to any video displayed on the screen 410 in addition to any non-auxiliary loudspeaker channel. Delay block 660 is preferably programmable to allow varying delays to be applied to different channels to adjust to different audiovisual system environments. Delay block 660 may be programmed with a value related to a time or distance, or a value that is proportional to a pre-determined delay or distance increment. For example, if the delay block 660 accepts a hexadecimal value for the delay applied to $C_{HRTF\_LF}$, a value of 0xFF may correspond to 510 feet where the increment is in distance (i.e., 2 feet per increment) or a value of 0x0F may correspond to 3.0 milliseconds where the increment is in time (i.e., 0.2 milliseconds per increment).

Figure 7:
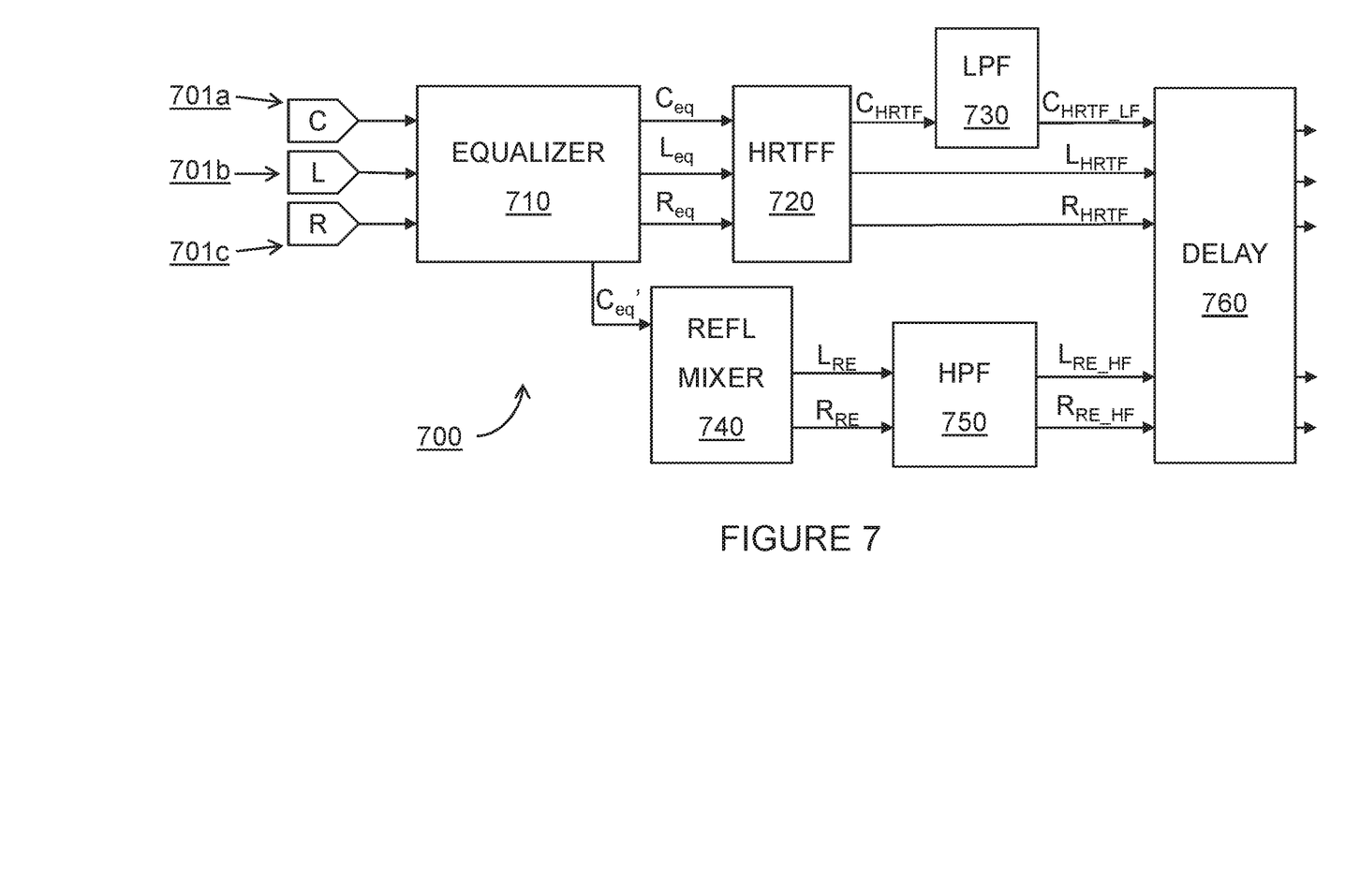
FIG. 7 illustrates another block diagram of signal processing circuitry that could be implemented to generate output(s) to one or more auxiliary loudspeakers included in the audiovisual systems of FIGS. 3-5 based only on a center channel, according to various embodiments.

FIG. 7 illustrates another block diagram of signal processing circuitry that could be implemented to generate output(s) to one or more auxiliary loudspeakers included in the audiovisual systems of FIGS. 3-5 based only on a center channel, according to various embodiments. Signal processing circuitry 700 may be present in processing unit 110 and used to generate outputs for an audiovisual system. In general, the signal processing circuitry 700 operate in a manner similar to the signal processing circuitry 600 described above in conjunction with FIG. 6, but with several simplified aspects. In particular, the center channel audio input 701a is the only channel used in the synthesis of reflector channels $L_{RE}$ and $R_{RE}$ by reflector mixer 740. Reflector mixer 740 receives the equalized center channel $C_{eq}'$ from equalizer 610 and generates reflector left and right reflector channels $L_{RE}$ and $R_{RE}$. No center reflector channel is synthesized. In one embodiment, the reflector mixer may adjust the level of $C_{eq}'$ by −3 dB to generate $L_{RE}$ and $R_{RE}$ so that when output, $L_{RE}$ and $R_{RE}$ acoustically combine to approximate the original power level of $C_{eq}'$. Additionally, because only the center channel is used in the synthesis of the reflector channels, only the center channel output from the HRTF filter 720 is filtered by low-pass filter 730 before delay block 760. By isolating a portion of the signal processing as described above to the center channel, the overall number of tunable parameters is reduced, which may simplify the installation process with little to no impact on perceptible audio quality.

Figure 8:
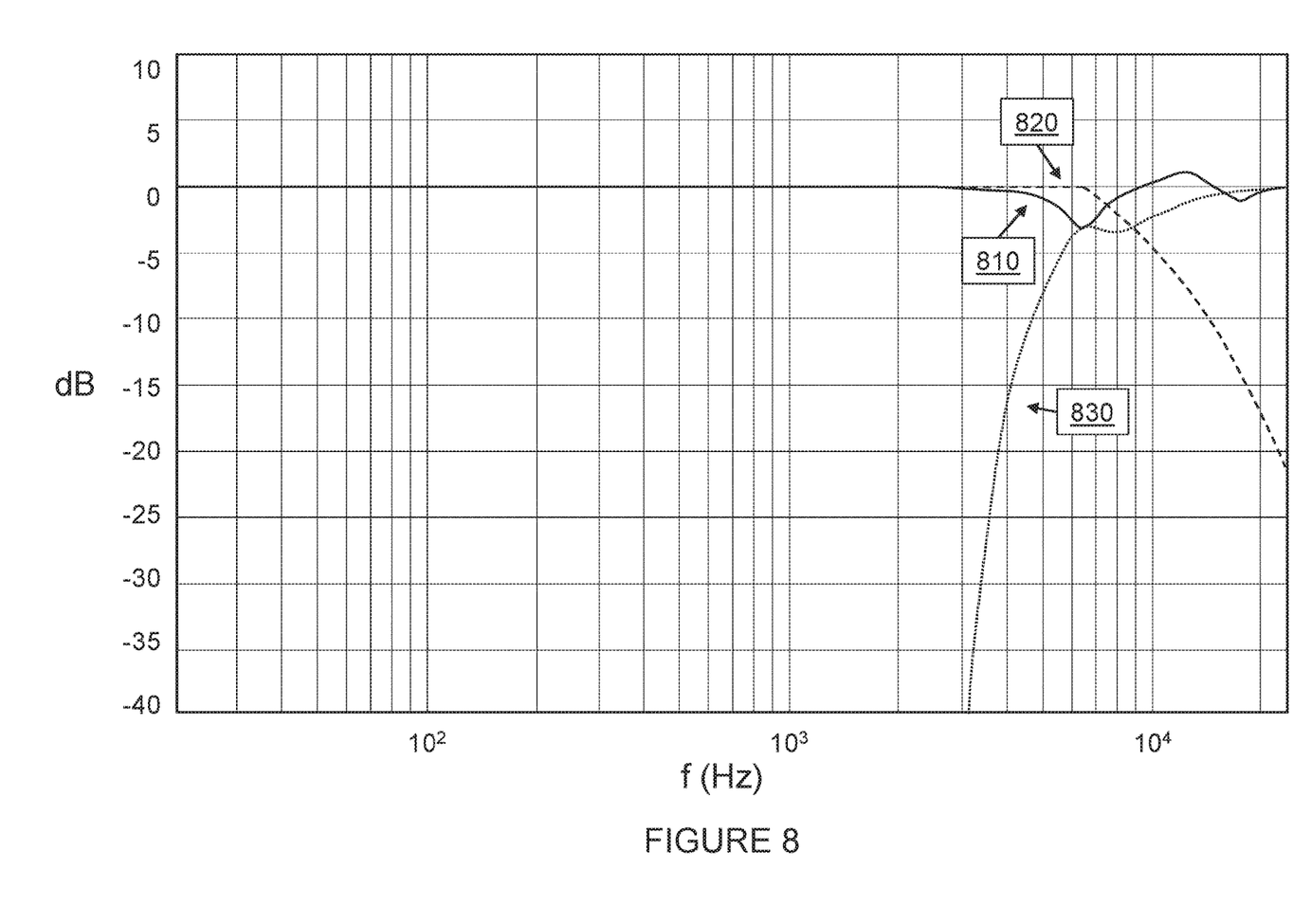
FIG. 8 illustrates the frequency response of an exemplary set of filters that may be used to by the computing system of FIG. 1 to generate output(s) to one or more primary loudspeakers and to one or more auxiliary loudspeakers in the audiovisual systems of FIGS. 3 and 4A, according to various embodiments.

FIG. 8 illustrates the frequency response of an exemplary set of filters that may be used to by the computing system of FIG. 1 to generate output(s) to one or more primary loudspeakers and to one or more auxiliary loudspeakers in the audiovisual systems of FIGS. 3-5, according to various embodiments. As explained above, the HRTF filtering may introduce tonal distortion and/or suppression of sound. Frequency response 810 depicts an exemplary byproduct of an HRTF filter. In this example, the HRTF filter suppresses frequencies between approximately 3 kHz and 10.3 kHz, with a peak of approximately −3 dB at approximately 6.5 kHz. This "notch" may affect each HRTF-filtered channel.

As explained above, sound from one or more auxiliary loudspeakers may augment sound from the primary loudspeaker(s) to counteract the negative effects of the HRTF filter. To minimize filtering artifacts and improve the sound quality, a smooth transition between the frequencies output by the primary loudspeaker(s) and the frequencies output by the auxiliary loudspeaker(s) may be preferable. A low-pass filter having a frequency response 820 is selected having a knee at approximately 6.5 kHz with a roll-off of approximately −8 dB/octave. The frequency response 830 of the complementary high-pass filter may be mathematically derived as follows: $HP = \sqrt{1 - LP_r^2}$ where $LP_r$ is the result of the cascaded HRTF and low-pass filters. In a preferred embodiment, both the high-pass filter and the low-pass filter are linear FIR filters having the same phase response and latency. Ideally, the summation of the filtered sound outputs from the primary loudspeaker(s) and the auxiliary loudspeaker(s) ideally produces a seamless power response curve across user perspectives.

Note that other filter arrangements may be used, including those that alter the order and/or type of filters used. For example, rather than the gradual transition of frequencies output between primary loudspeaker and auxiliary loudspeaker shown in FIG. 8, a low-pass filter having a sharp cutoff may be used to filter outputs to the primary loudspeaker(s) and a high-pass filter having a sharp cutoff may be used to filter outputs to the auxiliary loudspeaker(s). Alternatively, a band-stop filter may filter frequencies impacted by the HRTF filter from being output by the primary loudspeaker(s), while a band-pass filter may be used to produce the output from the auxiliary loudspeaker(s).

Figure 9:
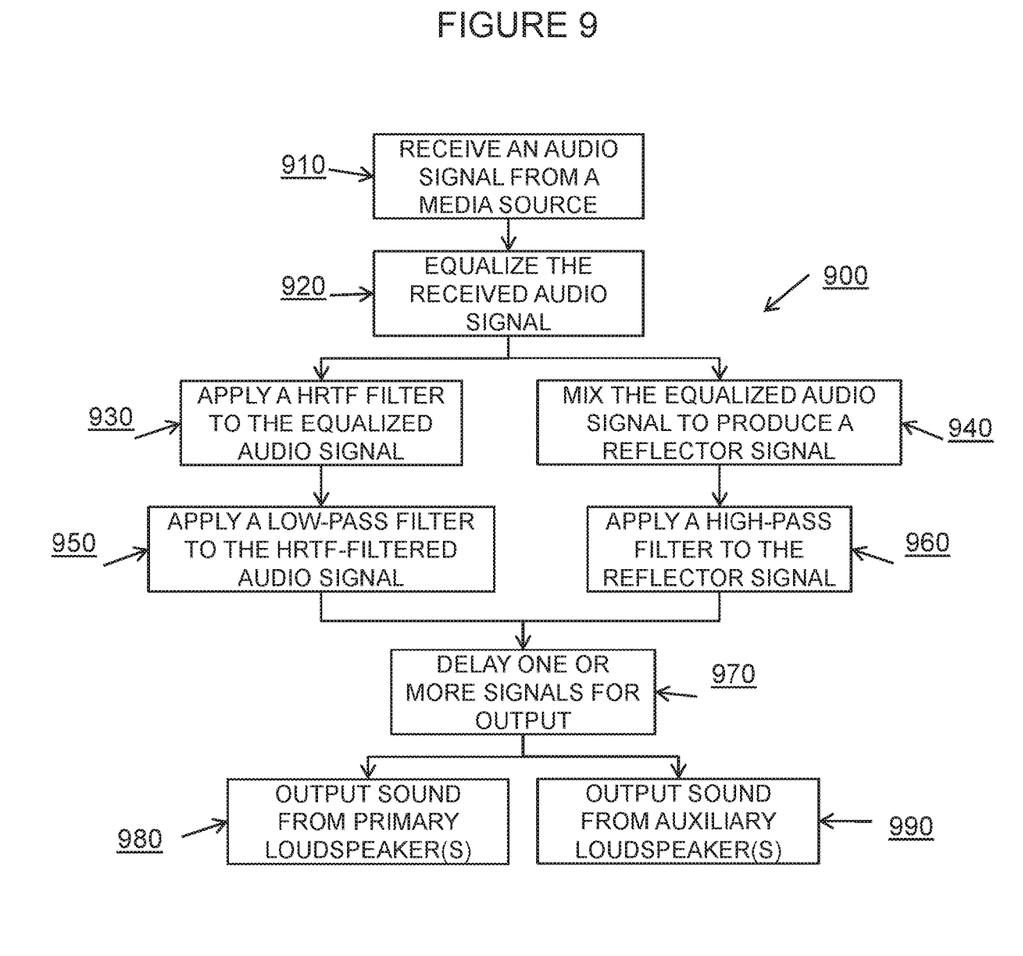
FIG. 9 is a flow diagram of method steps for generating output(s) to one or more primary loudspeakers and to one or more auxiliary loudspeakers in an audiovisual system, according to various embodiments.

FIG. 9 is a flow diagram of method steps for generating output(s) to one or more primary loudspeakers and to one or more auxiliary loudspeakers in an audiovisual system, according to various embodiments. Although the method steps are described in conjunction with FIGS. 3-8, persons skilled in the art will understand that any system configured to perform the method steps, in any order, falls within the scope of the various embodiments.

As shown, a method 900 begins at step 910, where the DSP application 132 receives an audio signal from a media source. Audio signal may comprise values in a time-series dataset representing an audio track accompanying a video. Audio signal may have multiple time-series datasets representing one or more audio channels. At step 920, DSP application 132 may equalize the frequency components of the received audio signal based on certain presets or parameters stored in memory 130 or database 134. Next, at step 930, the DSP application 132 may apply a HRTF filter to the equalized audio signal and then apply a low-pass filter to the HRTF-filtered signal at step 950. In applying each filter, DSP application may access memory 130 or database 134 for various filter parameters related to the HRTF filter and the low-pass filter.

In parallel, at step 940 the DSP application 132 may mix the equalized audio signal components to produce a reflector signal and then apply a high-pass filter to the reflector signal at step 960. Again, DSP application 132 may access memory 130 or database 134 for various parameters used to adjust the mixing of the equalized audio signals or the parameters of the high pass filter. Finally, at step 970, the DSP application 132 may delay one or more of the various filtered signals based on parameters stored in memory 130 or database 134. As noted above, in some embodiments, the signals for the auxiliary loudspeaker(s) may not be delayed. Additional details related to the above steps may be found in the discussion associated with FIGS. 6-8. The signals output at step 970 may be subjected to further processing before ultimately being routed to one or more loudspeakers for sound output. Finally, at steps 980 and 990, sound is output from the primary loudspeaker(s) and auxiliary loudspeaker(s), respectively, based on the processed signals output at step 970. The sound output from the auxiliary loudspeaker(s) reflects off of a screen and combines with sound output from the primary loudspeaker(s) to reduce or eliminate any tonal distortions and to align the audio image with the location of the visual sound source.

In sum, one or more auxiliary loudspeakers are positioned in front of the screen in an audiovisual system and generally aimed toward a screen. Such auxiliary loudspeakers may be positioned on the wall or ceiling of the location of the audiovisual system. Preferably, most of the sound energy output from the auxiliary loudspeaker(s) does not directly travel to a user perspective but reflects off of the screen and towards the user perspective. In some embodiments, one or more primary loudspeakers are positioned above, below, or on the side(s) of the screen and generally aimed toward the user perspective. Sound energy output from the primary loudspeaker(s) travels directly to the user perspective, acoustically combining at the viewing position with sound energy output from the auxiliary loudspeaker(s) and reflected off of the screen. To generate distinct audio signals for output by the primary and/or the auxiliary loudspeaker(s), various signal processing techniques may be implemented. The audio signal for the auxiliary loudspeaker(s) may pass through a high-pass filter, and the audio signal for the primary loudspeaker(s) may pass through a low-pass filter and/or a de-elevation filter.

At least one advantage of the techniques described herein is the reduction or elimination of any offset between the audio image and the location of the visual sound source in audiovisual systems having screens that are solid and/or otherwise non-transparent to sound waves, thereby reducing distraction and/or disorientation of a user. Additionally, the disclosed techniques enable high quality audio reproduction in audiovisual systems having such acoustically non-transparent screens, including in audiovisual systems where signal processing techniques, such as head-related transfer function filters, may have been implemented to adjust the audio image.

1. In some embodiments, a method comprises orienting a center axis of a first loudspeaker to intersect with a portion of a display screen; and outputting a first sound from the first loudspeaker towards the display screen, wherein a reflection of the first sound off of the display screen is directed towards a display screen viewing position.

2. The method of clause 1, further comprising outputting a second sound from a second loudspeaker, wherein the reflection of the first sound and the second sound combine at the display screen viewing position.

3. The method of clause 1 or 2, further comprising generating a first signal based on a received audio signal; and filtering the first signal to adjust an amplitude of at least one spectral component of the first signal to generate a filtered first signal, wherein the loudspeaker outputs the first sound based on the filtered first signal.

4. The method of any of clauses 1-3, wherein the first signal is based on a center channel of the received audio signal.

5. The method of any of clauses 1-4, wherein the filtering comprises filtering the first signal with a high-pass filter.

6. The method of any of clauses 1-5, further comprising filtering a received audio signal via a first filter that adjusts an amplitude of at least one spectral component of the audio signal to generate a second signal; and filtering the second signal via a low-pass filter to generate a filtered second signal, wherein the second sound is based on the filtered second signal.

7. The method of any of clauses 1-6, wherein the first filter is a head-related transfer function filter.

8. In some embodiments, a system comprises a first loudspeaker configured to output a first sound, wherein a center axis of the first loudspeaker intersects a portion of a display screen, and wherein a reflection of the first sound off of the display screen is directed towards a display screen viewing position; and a second loudspeaker configured to output a second sound, wherein a center axis of the second loudspeaker aimed away from the display screen, and the reflection of the first sound and the second sound combine at the display screen viewing position.

9. The system of clause 8, further comprising: an audio module configured to generate a first signal from a received audio signal; and a filter configured to filter the first signal to generate a filtered first signal, wherein the first sound is based on the filtered first signal.

10. The system of clauses 8 or 9, wherein the first signal is based on a center channel of the received audio signal.

11. The system of any of clauses 8-10, wherein the filter is a high-pass filter.

12. The system of any of clauses 8-11, further comprising a first filter configured to adjust an amplitude of at least one spectral component of a received audio signal to generate a second signal; a second filter configured to generate a filtered second signal based on the second signal, wherein the second sound is based on the filtered second signal.

13. The system of any of clauses 8-12, wherein the first filter is a head-related transfer function filter.

14. The system of any of clauses 8-13, wherein the second filter is a low-pass filter.

15. In some embodiments, a method comprises storing a value related to at least one of (i) a distance between a first loudspeaker and a second loudspeaker, and (ii) a distance between the first loudspeaker and a display screen; and causing a first signal to be delayed by at least an amount of time proportional to the value.

16. The method of clause 15, wherein the first signal is a video signal.

17. The method of clauses 15 or 16, wherein the second loudspeaker outputs a sound based on the first signal.

18. The method of any of clauses 15-17, further comprising applying a head-related transfer function filter to a received audio signal to generate an adjusted signal, wherein the head-related transfer function filter adjusts an amplitude of at least one spectral component of the received audio signal, and a loudspeaker outputs a sound based on the adjusted signal.

19. The method of any of clauses 15-18, wherein the first signal is based on the adjusted signal.

20. The method of any of clauses 15-19, further comprising applying a low-pass filter to the adjusted signal before the loudspeaker outputs the sound based on the adjusted signal.

Any and all combinations of any of the claim elements recited in any of the claims and/or any elements described in this application, in any fashion, fall within the contemplated scope of the present invention and protection The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A method comprising:
orienting a center axis of a first loudspeaker to intersect with a portion of a display screen;
outputting a first sound from the first loudspeaker towards the display screen, wherein a reflection of the first sound off of the display screen is directed towards a display screen viewing position;
adjusting an amplitude of the first sound based on one or more of a coefficient of reflectivity of the display screen, a distance between the first loudspeaker and the display screen, and a distance between the display screen and the viewing position; and
outputting a second sound from a second loudspeaker, wherein the reflection of the first sound and the second sound combine at the display screen viewing position.

2. The method of claim 1, further comprising:
generating a first signal based on a received audio signal; and
filtering the first signal to adjust an amplitude of at least one spectral component of the first signal to generate a filtered first signal, wherein the first loudspeaker outputs the first sound based on the filtered first signal.

3. The method of claim 2, wherein the first signal is based on a center channel of the received audio signal.

4. The method of claim 2, wherein the filtering comprises filtering the first signal with a high-pass filter.

5. The method of claim 1, further comprising:
filtering a received audio signal via a first filter that adjusts an amplitude of at least one spectral component of the audio signal to generate a second signal; and
filtering the second signal via a low-pass filter to generate a filtered second signal, wherein the second sound is based on the filtered second signal.

6. The method of claim 5, wherein the first filter is a head-related transfer function filter.

7. A system comprising:
a first loudspeaker configured to:
output a first sound, wherein a center axis of the first loudspeaker intersects a portion of a display screen, and wherein a reflection of the first sound off of the display screen is directed towards a display screen viewing position;
a memory that includes instructions;
a processor that is coupled to the memory and, when executing the instructions, is configured to adjust an amplitude of the first sound based on one or more of a coefficient of reflectivity of the display screen, a distance between the first loudspeaker and the display screen, and a distance between the display screen and the viewing position; and
a second loudspeaker configured to output a second sound, wherein a center axis of the second loudspeaker aimed away from the display screen, and the reflection of the first sound and the second sound combine at the display screen viewing position.

8. The system of claim 7, further comprising:
an audio module configured to generate a first signal from a received audio signal;
a filter configured to filter the first signal to generate a filtered first signal, wherein the first sound is based on the filtered first signal.

9. The system of claim 8, wherein the first signal is based on a center channel of the received audio signal.

10. The system of claim 8, wherein the filter is a high-pass filter.

11. The system of claim 7, further comprising:
a first filter configured to adjust an amplitude of at least one spectral component of a received audio signal to generate a second signal; and
a second filter configured to generate a filtered second signal based on the second signal, wherein the second sound is based on the filtered second signal.

12. The system of claim 11, wherein the first filter is a head-related transfer function filter.

13. The system of claim 11, wherein the second filter is a low-pass filter.

14. A method comprising:
storing a value related to a distance between a first loudspeaker and a second loudspeaker, wherein the first loudspeaker outputs a first sound towards a display screen, a reflection of the first sound off of the display screen is directed towards a display screen viewing position, a second loudspeaker outputs a second sound, and the reflection of the first sound and the second sound combine at the display screen viewing position; and
causing a first signal to be delayed by at least an amount of time proportional to the value, wherein the first signal includes at least one of a video signal and a non-auxiliary loudspeaker signal.

15. The method of claim 14, wherein the first signal is a video signal.

16. The method of claim 14, wherein the second loudspeaker outputs the second sound based on the first signal.

17. The method of claim 14, further comprising applying a head-related transfer function filter to a received audio signal to generate an adjusted signal, wherein the head-related transfer function filter adjusts an amplitude of at least one spectral component of the received audio signal, and the first loudspeaker outputs a sound based on the adjusted signal.

18. The method of claim 17, wherein the first signal is based on the adjusted signal.

19. The method of claim 17, further comprising applying a low-pass filter to the adjusted signal before the first loudspeaker outputs the sound based on the adjusted signal.

* * * * *